No. 611,814. Patented Oct. 4, 1898.
A. MILLAR.
INSOLUBLE GELATIN THREAD OR FILAMENT.
(Application filed July 28, 1896.)
(No Model.)
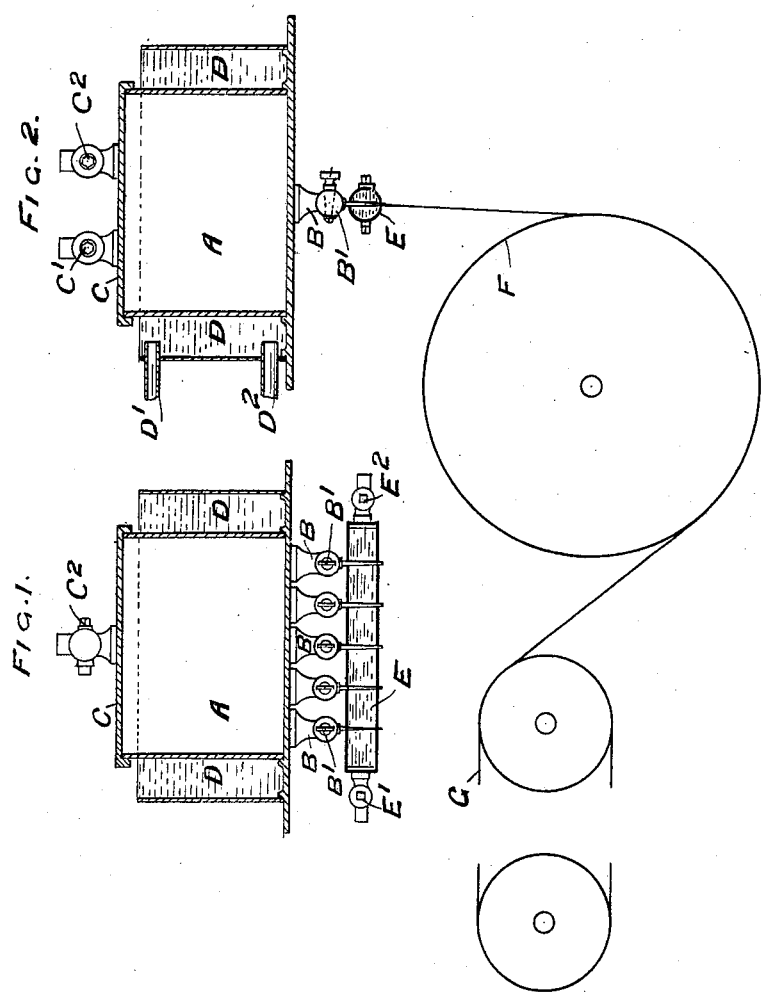

UNITED STATES PATENT OFFICE.

ADAM MILLAR, OF GLASGOW, SCOTLAND.

INSOLUBLE GELATIN THREAD OR FILAMENT.

SPECIFICATION forming part of Letters Patent No. 611,814, dated October 4, 1898.

Application filed July 28, 1896. Serial No. 600,800. (No specimens.) Patented in England August 15, 1894, No. 15,522; in Germany July 11, 1895, No. 88,225; in France July 11, 1895, No. 248,830; in Belgium July 15, 1895, No. 116,538; in Austria August 14, 1895, No. 45/2,879, and in Switzerland August 5, 1896, No. 12,728.

*To all whom it may concern:*

Be it known that I, ADAM MILLAR, manufacturer, of 45 Montrose street, in the city of Glasgow, Scotland, have invented certain new and useful Insoluble Gelatin Threads or Filaments, of which the following is a specification.

The invention has been patented in Great Britain, No. 15,522, dated August 15, 1894; in France, No. 248,830, dated July 11, 1895; in Belgium, No. 116,538, dated July 15, 1895; in Germany, No. 88,225, dated July 11, 1895; in Switzerland, No. 12,728, dated August 5, 1896, and in Austria, No. 45/2,879, dated August 14, 1895.

This invention consists in producing fibers or filaments of gelatin, which fibers or filaments shall be rendered practically insoluble in water by the action of one or more of such chemical products as are well known to possess the power of rendering gelatin insoluble in water.

The word "gelatin" employed in the specification is to be understood as including the commercial products known as "glue," "isinglass," and "gelatin" and any other material of which gelatin, in the chemical sense of the word, forms an essential part, and it also applies to analogous animal substances and albumen.

In carrying out this invention the gelatin is dissolved in hot water, and the chemical substances, such as bichromate of potash or other compound, added to the solution either by adding them directly or, by preference, in the form of a solution. The mixed solution is then concentrated by evaporation to a suitable degree of thickness. The concentrated glutinous mixture is then transferred to a vessel furnished with a series of nozzles or nipples, through which nipples the mixture is forced in the form of fine threads.

Apparatus suitable for the production of the filaments is illustrated by the accompanying drawings, Figures 1 and 2 being sections at right angles to each other. It consists of a cylindrical vessel A, having a number of tubes B projecting from its lower end or base, each tube being furnished with a tap or stop-cock B' and terminating in a nozzle or nipple having a very small aperture. The upper end of the vessel A is closed by an air-tight cover or cap C, furnished with two tubular projections with stop-cocks C' C². The vessel A is surrounded by a cylindrical jacket D, having an inlet-pipe D' and an outlet-pipe D². The series of tubes B are encompassed by another jacket in the form of a closed cylinder E, through which the tubes B pass, so that the nozzles project beyond the under side of the cylinder. An inlet-cock E' and an outlet-cock E² are attached to the ends of the cylindrical jacket. The vessel A is filled with the concentrated solution of gelatin by the cock C², which is then closed. The solution is maintained in a liquid form by a stream of hot water passing into the jacket D by the inlet-pipe D' and running off by the outlet-pipe D². This stream of water should be about 200° Fahrenheit and is supplied by a hot-water cistern. (Not shown in the drawings.) The jacket E is also filled with hot water, but at a lower temperature than the other—say about 100° Fahrenheit—at which temperature the gelatin solution can be drawn into a fine thread or filament. A second hot-water cistern (not shown in the drawings) communicates by a pipe with the inlet-cock E', and the outlet-cock E² is adjusted so that the proper temperature of the jacket is maintained.

The gelatin solution in the tubes is too glutinous at the temperature of 100° Fahrenheit to flow freely through the fine apertures of the nozzles without a slight pressure. This pressure may be produced in several ways; but by preference I employ compressed air. The compressed air is contained in a receiver or reservoir furnished with a suitable pressure-gage and an escape-valve to prevent overpressure and connected with an air-pump operated by any convenient mechanical arrangement. A pipe passes from the receiver to the tubular piece C' on the cover of the vessel A. The compressed-air receiver and air-pump are not shown in the drawings. The gelatin solution is forced through the nozzles in fine threads by the action of the compressed air, and these threads may be drawn out to a much greater degree of fineness before they are cold and hard by means of a drum or wheel F, moving at a sufficiently quick speed, and from which drum F the filaments are passed on to an endless traveling web G, moving at the same speed as the periphery of the drum. The filaments may be reeled off from the opposite end of the traveling web G either singly or in a group of several filaments twisted together in the manner of silk yarn. The arrangements for so reeling or twisting are similar to the methods in every-day use in silk manufacture and need not be described.

The chemical products employed to render the soluble gelatin insoluble may be applied to the gelatin in solution before it is formed into filaments, or the filaments may be produced from simple gelatin and the "hardening" process effected as a second process after the filaments are formed.

The process of rendering the filaments insoluble may obviously be done partly when the gelatin is in the liquid form and partly after the filaments are formed.

The "chemical products" referred to in this specification are those chemicals frequently employed in various photographic processes and include common alum, chrome alum, tannic acid, gallic acid, chromic acid, tungstic acid, and compounds of these acids; also, the recently-introduced material called "formic aldehyde," to render the gelatin insoluble.

The hardness of the filaments may be modified by small quantities of glycerin or castor-oil added to the gelatin solution. Coloring-matter may also be added either in the form of fine pigments or of liquid extracts or decoctions.

The invention herein described differs from such as embody the production of threads from compositions containing gelatin in this respect that it consists in treating threads made from gelatin alone with a minute quantity of bichromate of potash, formic aldehyde, or like substance having the property of rendering the gelatin insoluble, while the object hitherto has been to produce threads from cellulose or compositions including cellulose and using gelatin in combination therewith as a size or stiffener for the threads. In the latter case the gelatin in the thread is not not rendered insoluble, but would immediately be dissolved out in contact with water.

Having now described the invention, what I desire to claim and secure by Letters Patent is—

As a new article of manufacture, a thread or filament composed of gelatin, said filament being insoluble substantially as described.

Signed at Glasgow, Scotland, this 3d day of July, 1896.

ADAM MILLAR.

Witnesses:
WALLACE FAIRWEATHER,
JNO. ARMSTRONG, Jr.